(12) United States Patent
Panabaker

(10) Patent No.: US 7,423,695 B2
(45) Date of Patent: Sep. 9, 2008

(54) DISPLAYING AN INTENDED VIDEO IMAGE

(75) Inventor: Ruston Panabaker, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 553 days.

(21) Appl. No.: 11/051,034

(22) Filed: Feb. 4, 2005

(65) Prior Publication Data

US 2006/0176397 A1    Aug. 10, 2006

(51) Int. Cl.
  *H04N 9/74* (2006.01)
(52) U.S. Cl. ...................................... 348/581
(58) Field of Classification Search ......... 348/581–582, 348/441, 445, 458, 459, 571, 576, 561; 725/109, 725/110, 32
  See application file for complete search history.

(56) References Cited

U.S. PATENT DOCUMENTS

| | | | | |
|---|---|---|---|---|
| 5,790,096 A | * | 8/1998 | Hill, Jr. ....................... | 345/600 |
| 5,973,734 A | * | 10/1999 | Anderson ..................... | 348/239 |
| 6,982,763 B2 | * | 1/2006 | Perry .......................... | 348/441 |
| 7,019,792 B2 | * | 3/2006 | Kimura ....................... | 348/744 |
| 2003/0058229 A1 | * | 3/2003 | Kawabe et al. .............. | 345/204 |
| 2005/0157171 A1 | * | 7/2005 | Bowser ....................... | 348/174 |
| 2005/0160468 A1 | * | 7/2005 | Rodriguez et al. .......... | 725/109 |
| 2005/0206784 A1 | * | 9/2005 | Li et al. ....................... | 348/441 |
| 2006/0059514 A1 | * | 3/2006 | Hsiao et al. .................. | 725/42 |

* cited by examiner

*Primary Examiner*—Paulos M Natnael
(74) *Attorney, Agent, or Firm*—Lee & Hayes, PLLC

(57) ABSTRACT

Techniques for displaying an intended video image are described herein. One exemplary method ascertains whether an image generated from a video signal is to be cropped. Based upon whether the image is to be cropped, the method selectively takes an action to enhance a user experience relating to the image.

17 Claims, 4 Drawing Sheets

100 ↴

| DISPLAY 108 | | VIDEO SIGNAL 102 | |
|---|---|---|---|
| | | VIDEO SIGNAL CONTAINS OVERSCAN 104 | VIDEO SIGNAL WITHOUT OVERSCAN 106 |
| | TV 110 | NO ACTION 114 | ACTION 116 |
| | MONITOR 112 | ACTION 118 | NO ACTION 120 |

| DISPLAY 208 | | SOURCE 202 | |
|---|---|---|---|
| | | CABLE TV NETWORK 204 | PC 206 |
| | TV 210 | NO ACTION 214 | ACTION 216 |
| | MONITOR 212 | ACTION 218 | NO ACTION 220 |

Fig. 2

DISPLAYING AN INTENDED VIDEO IMAGE

TECHNICAL FIELD

The description relates to techniques for displaying an intended video image.

BACKGROUND

For decades, television users have tuned their televisions to their favorite broadcast programs. Whether the source of such broadcast programs is a traditional local broadcasting station, cable, satellite or other means, the broadcast signals adhere to configurations determined by a standards association. The standards define parameters of the video signals for delivery to televisions. Likewise the televisions also conform to related standards such that images generated from the video signals will appear generally the same on different televisions. These standards mandate that the video signal will be configured to have overscan, which means that a portion of the video signal is not intended to form any portion of the image intended to be displayed for the user. Stated another way, only a subset of a potential image which can be generated from the video signal is actually displayed as an intended image to the user. The remainder of the potential image is cropped and is not displayed. The cropped portion may be utilized, among other uses, to convey information to the television regarding the intended image.

This system of broadcast video signal standards and associated television standards have evolved over many years and ensure that a consumer can purchase a television with confidence that when he or she takes it home it will work as expected to receive the broadcast signals and display the intended image. The consumer does not need to know anything about overscan or cropping or take any affirmative action in this regard.

Meanwhile computers, such as personal computers (PCs), also have become a common consumer item. Computers can also generate video signals for creating user-perceptible images. The video signals are created by an operating system and/or other components of the computer (e.g., video card). The video signals have traditionally been utilized by a display, such as a monitor, to create images for the user. In contrast to broadcast video signals and televisions, the computers and monitors generally are configured to display an image for the user without cropping the image. Stated another way, the intended image generated for the user is generally the same as the potential image which can be generated from the video signal.

These two distinct systems of televisions and computers have served consumers well, but as technology progresses the distinction between these two systems is becoming blurred. Consumers increasingly want to utilize their televisions as computer monitors. In many instances, such a configuration provides an undesirable user experience. The televisions, just as with the broadcast video signals, crop the image generated from the computer's video signal. Such cropping results in portions of the intended image, such as around the periphery, not being displayed for the user. This is especially problematic in that many user interfaces position user input controls, such as toolbars, around the periphery of the image. When these portions of the image are missing, the user may not be able to input commands. For example, the user may not be able to start, stop, or minimize an application. Among other reasons, such scenarios provide diminished consumer satisfaction. Systems which allow an intended image to be generated for a user from either type of video would increase consumer satisfaction.

SUMMARY

Techniques for displaying an intended video image are described herein. One exemplary method ascertains whether an image generated from a video signal is to be cropped. Based upon whether the image is to be cropped, the method selectively takes an action to enhance a user experience relating to the image.

BRIEF DESCRIPTION OF THE DRAWINGS

FIGS. 1-2 illustrate tables which can aid in determining instances in which an action can be taken to enhance a user-experience.

DETAILED DESCRIPTION

Overview

Figure 3:
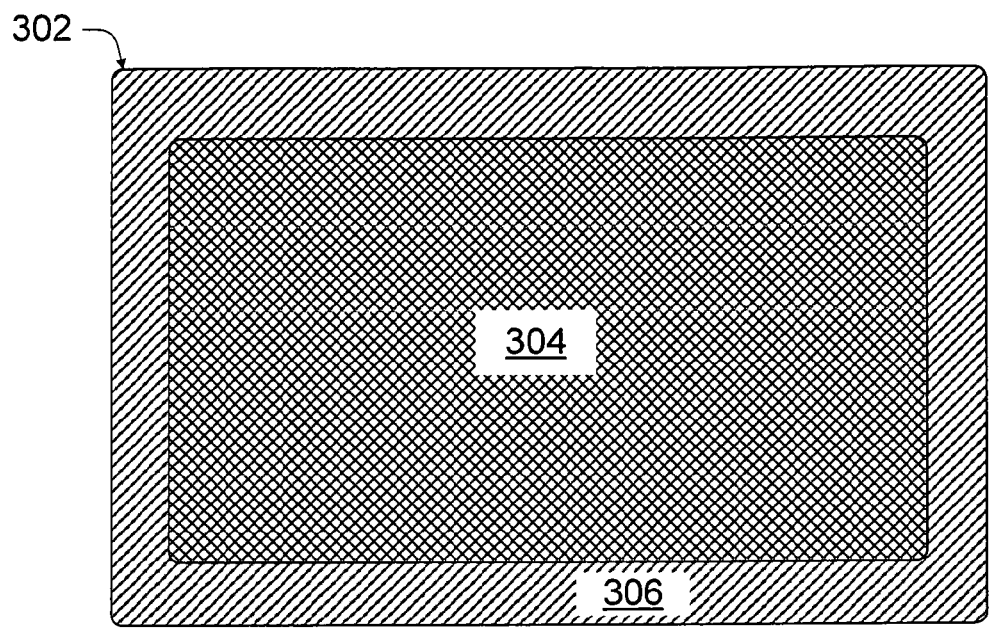
FIGS. 3-4 illustrate representations of images which can be generated from a video signal.

The following description relates to techniques for generating a user-perceptible image from a video signal. Some video signal's are configured with overscan and are intended to have a portion of an image generated from the video signal cropped. The overscan portion of the image is not intended to be included in a user-perceptible portion of the image. Such a video signal may be referred to herein as a video signal with overscan. Conversely, other video signals do not include overscan. If a video signal without overscan is cropped, a portion of the intended image is not perceptible to a user and the user experience is diminished. This type of video signal may be referred to herein as a video signal without overscan. For instance, if a video signal from a PC is cropped by a display, the user may not be able to see items such as toolbars which are often placed around the periphery of the image.

For purposes of explanation, assume that one exemplary system includes a source configured to generate the video signal and a display configured to generate an image from the video signal for presentation to a user. The system can determine if an action can be taken such that a user's experience related to viewing the image can be enhanced. For instance, at least some implementations ascertain whether an image generated from a video signal should be cropped. In some instances the system evaluates the video signal to determine if the image should be cropped. In other instances, the system can evaluate the source of the video signal to determine if the image should be cropped. The system may or may not take an action to enhance the user experience based upon whether the image should be cropped and in light of a configuration of the display which will generate the image.

Consider FIG. 1 as an example of a table 100 for use where the system examines a video signal 102 to determine if an action should be taken to enhance a user experience related to an image generated from the video signal. In this instance, either a video signal which contains overscan is identified at 104 or a video signal without overscan is identified at 106. The system also contains a display 108. The display may be a display configured to crop a portion of the image created from the video signal ("cropping display"). Such a display is represented by TV 110. Alternatively, the system may contain a display which does not crop an image generated from the video signal ("non-cropping display"). Such a display is represented by monitor 112. As indicated generally at 114, where the video signal contains overscan and the TV is configured to crop the image generated from the video signal, then no further action is taken to enhance the user experience. In contrast, as indicated generally at 116, where the video signal does not contain overscan, and the TV is configured to crop the image generated from the video signal, an action may be taken to enhance the user experience. Examples of such actions will be described in more detail below. Similarly, as indicated generally at 118, where the video signal contains overscan and the monitor is not configured to crop the image, an action may be taken to enhance the user experience. As indicated generally at 120, no further action is taken in the instance where the video signal does not contain overscan and the monitor is not configured to crop the image generated from the video signal.

Consider FIG. 2 as an example of a table 200 for use where the system examines the system components to determine if a further action should be taken to enhance a user experience. In this instance, a system source 202 is identified as either a source which is configured to generate a video signal that includes overscan ("overscan source") or a source which generates a video signal which does not contain overscan ("non-overscan source"). In this instance, the overscan source is represented as a cable TV network 204, and the non-overscan source is represented as a PC 206. A video signal generated by the source can be displayed on display 208 which is either configured to crop the image or not to crop the image. In this instance, the cropping display is represented by TV 210, while the non-cropping display is represented by monitor 212. As indicated generally at 214, where the source is cable TV network 204 configured to generate a video signal with overscan and the display is TV 210 configured to crop the image then no further action is taken to enhance the user experience. In contrast, as indicated generally at 216, an action can be taken to enhance the user experience where the source comprises PC 206 configured to generate a video signal without overscan and the TV is configured to crop the image. Further, as indicated generally at 218, further action may be taken when the cable TV network 204 generates a video signal with overscan for monitor 212 which is configured not to crop the image. As indicated generally at 220, no action is taken in the instance where the PC 206 generates a video signal for monitor 212. FIGS. 1 and 2 illustrate but two of many possible scenarios which can be addressed by at least some of the present implementation for determining whether an action can be taken to enhance the user experience.

Once a determination is made that an action should be taken to enhance the user experience, several possible approaches can be addressed. In but one example, where the system determines that an action should be taken to enhance the user experience, the system components may negotiate the video signal configuration. For instance, a display configured to crop an image may request the video signal be formatted so that the intended image is contained within a specific portion of the display's aperture. In another example, one of the system components, may take an action to enhance the user-experience with the available video signal. For example, the display may scale the image so that an intended image is displayed for the user.

The implementations below are described in the context of a computing environment. Various embodiments can be implemented by computer-executable instructions or code means, such as program modules, that are executed by a device or component having processing capabilities. Such devices can include computers, such as personal computers or PCs, televisions and monitors among others. Generally, program modules include routines, programs, objects, components, data structures and the like that perform particular tasks or implement particular abstract data types.

Various embodiments may be implemented in computer system configurations other than a PC. For example, various embodiments may be realized in consumer devices such as hand-held devices, multi-processor systems, microprocessor-based or programmable consumer electronics, network PCs, minicomputers, mainframe computers, televisions, monitors, cell phones, personal digital assistants and the like. Alternately or additionally, various embodiments may also be practiced in distributed computing environments, where tasks are performed by remote processing devices that are linked through a communications network. In a distributed computing environment, program modules may be located in both local and remote memory storage devices.

Exemplary Implementations

FIG. 3 illustrates a potential image 302 which can be generated from a video signal with overscan. The potential image 302 has a desired or intended image 304 and a remaining or cropped portion 306. The intended image 304 is a sub-set of the potential image and is intended to be presented to a user for viewing. The cropped portion 306 of the potential image is intended to be cropped and not to be presented to a user. For purposes of illustration, the cropped portion 306 may be proportionately exaggerated in relation to intended image 304. In the overscan configuration, the potential image 304 may in some implementations be analogous to a production aperture of a display, while the intended image may be analogous to a clean aperture.

Figure 4:
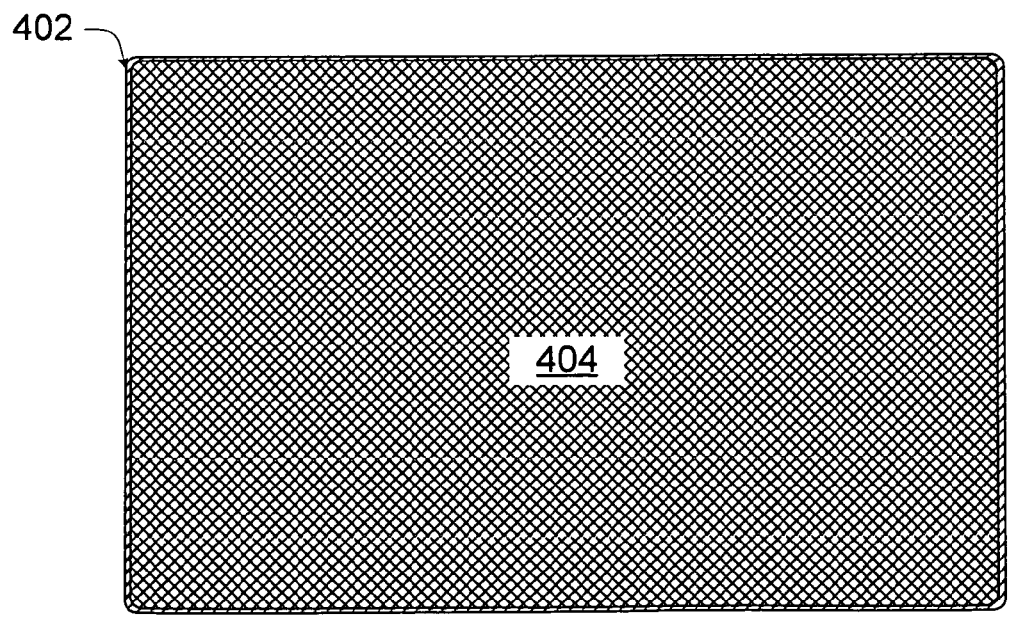

In contrast to FIG. 3, FIG. 4 illustrates a potential image 402 which can be generated from a video signal without overscan. In this instance, potential image 402 generally approximates intended image 404 where no cropping is intended. If such an image is cropped, content, such as around the periphery, which is intended to be perceivable by the user is not displayed for the user. For purposes of illustration, in FIG. 4 some delineation is shown between potential image 402 and intended image 404. In some implementations the two images may be identical.

Figure 5:
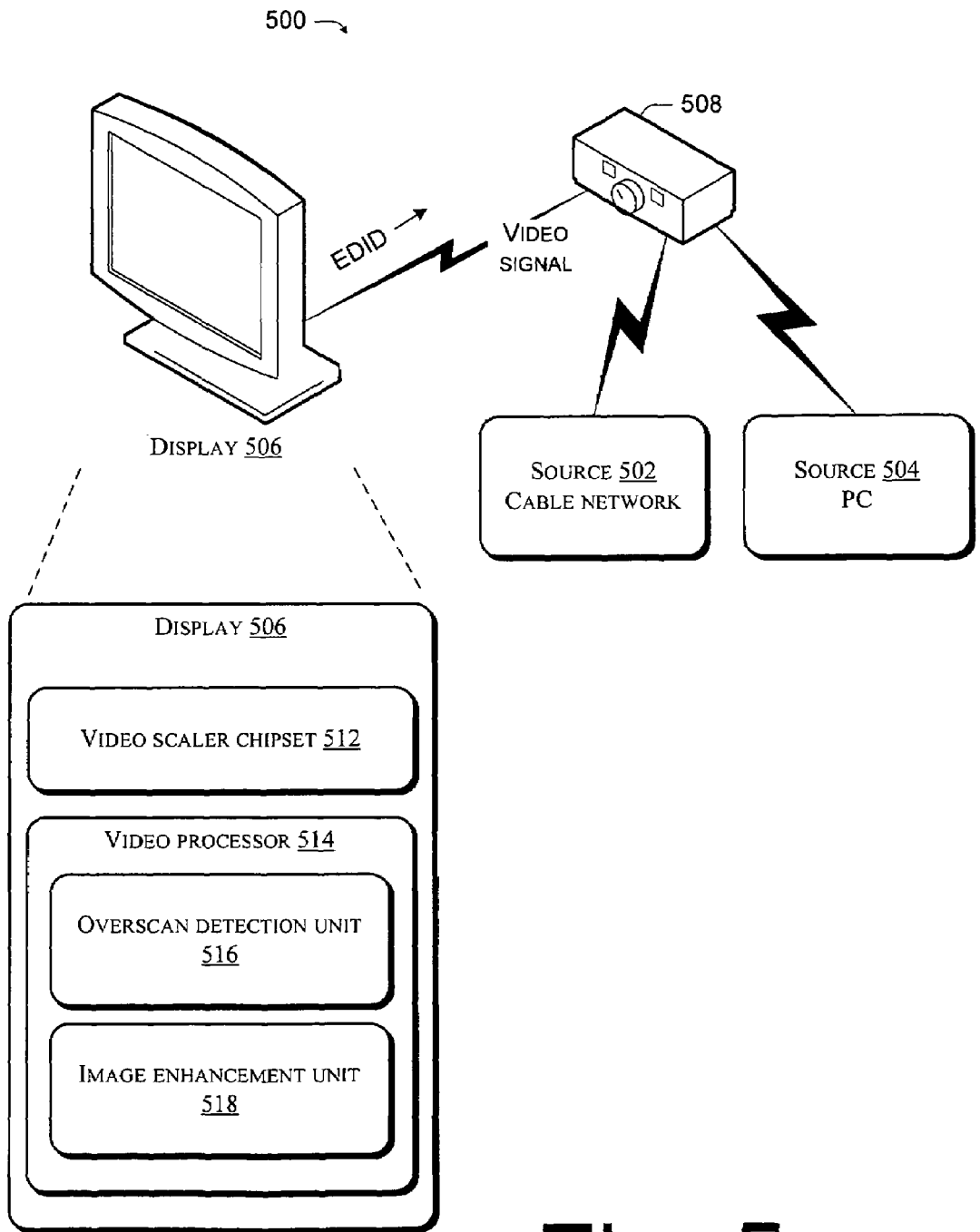
FIG. 5 illustrates an exemplary system for displaying an intended video image.

FIG. 5 illustrates exemplary system 500 configured to generate video signals and to create images from the video signal. System 500 is further configured to ascertain whether an image generated from a video signal should be cropped. Based upon whether or not the image should be cropped, the system can selectively take an action to enhance a user experience relating to the image. In this implementation, system 500 includes one or more sources configured to generate a video signal which may or may not contain overscan. In this instance, system 500 includes a source 502 in the form of a cable network and a source 504 in the form of a PC. System 500 further includes a display 506 configured to generate an image from video signals. In the illustrated configuration, sources 502, 504 are coupled to a switch 508 which selectively couples an individual source to the display at any particular instant.

Display 506 may be a cropping display configured to default to a condition where the display crops an image generated from the video signal or a non-cropping display which defaults to a configuration which does not crop the image. Assume for purposes of explanation, that for the remainder of the discussion relating to FIG. 5, that display 506 is a cropping display, such as a TV, which is configured to crop the image. In this implementation, display 506 includes a video-scaler chipset 512, and a video processor 514. The video processor includes an overscan detection unit 516 and an image enhancement unit 518.

In this example source 502 is an overscan source in the form of a cable network configured to generate a video signal such that an image generated from the video signal is intended to be cropped. Examples of other sources configured to generate a video signal with overscan include television signals broadcast over the airways, television signals delivered by satellite, and video signals from digital versatile disc (DVD) players and video cassette recorders (VCRs), among others.

Source 504 is a non-overscan source in the form of a PC configured to generate a video signal without overscan such that an image generated from the video signal is not intended to be cropped. Other examples of sources configured to generate video signals without overscan include video signals received from computer operating systems, such as personal computer operating systems, personal digital assistants (PDAs), and cell phones, among others. For purposes of explanation, this particular configuration includes one source configured to generate a video signal with overscan and another source configured to generate a video signal without overscan. Other configurations may include only a single source, while still other configurations may include a multitude of sources.

In system 500, a video signal is conveyed from an individual source to display 506. For instance, display 506 may receive the video signal through a physical connection such as a VGA, DVI, HDMI or equivalent which is communicably coupled to the source and/or to an intermediary component such as switch 508. Alternatively or additionally, the video signal may be received as a light wave such as radio frequency light waves. Though not specifically illustrated, display 506 may be coupled to an individual source via another communication means. For instance display 506 may be coupled to PC source 504 via a display data channel (DDC). The DDC can provide data to the system which can be utilized by the system components for configuration purposes as will be described in more detail below.

System 500 is further configured to ascertain whether an image generated from the video signal should be cropped. In this instance, at least the display's processor 514 is configured to ascertain whether an image generated from the video signal should be cropped. Alternatively or additionally other system components such as source 502, 504 or switch 508 can be configured to ascertain whether the image should be cropped.

In some implementations, communications between system components may ascertain whether or not the image should be cropped. For example, display 506 may query an individual source to determine if a video signal from the source contains overscan. In one such example, such communication can occur as negotiations among various system components prior to a video signal being sent over the system. For example, some system configurations allow negotiations between the display and the source about various parameters of the video signal prior to delivery of the video signal. Some of these implementations negotiate system parameters by communicating via information packets. An extended display identification data (EDID) packet can provide but one example of such an information packet. The EDID acts as a tool used to negotiate a video interconnect prior to delivery of the video signal. As will be described below, subsequent EDIDs can be sent during delivery of the video signal to renegotiate the video interconnect.

Display 506 can send an EDID to the source such as PC source 504. The EDID can describe the display's configuration (e.g. whether the display crops the image). Alternatively or additionally, the display may describe its desired video signal configuration in the EDID. Further, more than one EDID may be exchanged between the display and the source. For example, assume that the display is configured to crop the image and after the first EDID the display determines that the video signal is not configured to be cropped, the display may send a subsequent EDID to the source requesting that one or more parameters of the video signal be adjusted.

Alternatively or additionally to the above described techniques, display 506 may receive the video signal and utilize one or more techniques to ascertain whether the resultant image should be cropped. For example, video scaler chipset 512 can convert the video signal into a bit stream. The video processor may analyze the bit stream to ascertain whether the resultant image should be cropped. Other examples are described in more detail below.

Assume now that display 506 has determined that an action can be taken to enhance the image which the display generates from the video signal (examples of such scenarios are described above in relation to FIGS. 1-2). In this instance, assume that based upon its communications with the source and/or its evaluation of the video signal, the display determines that the video signal should not be cropped. As mentioned above, for purposes of explanation, assume that the display is configured to crop the image. The display can take one or more actions to enhance the video signal. For instance, the display may, such as with an EDID, re-negotiate the video signal configuration with the source. For instance, the display may request that the intended image be formatted so that the intended image corresponds to certain pixels of the video signal. In another example, the display may take some type of action, such as resealing, such that portions of the image which are intended to be displayed for a user are not cropped.

In the illustrated example, switch 508 selectively couples an individual source to display 506. This is but one of many possible configurations. For instance, the source or sources may be coupled directly to the display. Further, the display may or may not contain some internal type of switch to perform an equivalent functionality. Further, the switch may act as a central system point which is coupled to multiple sources and multiple displays and which is configured to selectively couple individual sources to individual displays. In one such configuration, the switch may have the capacity to evaluate individual sources and individual displays to determine if an action can be taken to enhance the user experience related to any image generated from the combination of a particular source and a particular display. In such configurations, the switch may cause such an action to be performed such that a user experience is enhanced.

Though for purposes of explanation FIG. 5 describes displays which either default to cropping the image or default to a condition which does not crop the image, other displays may not default to either condition. For instance, such displays may ascertain whether an image generated from a video signal should be cropped or not and then responsively act to crop or not crop. Alternatively to having a built-in default setting, the display may allow the user to select the default configuration, and/or a configuration at a particular instance through a user-interface.

Alternatively or additionally to the system ascertaining whether an image generated from a video signal should be cropped or not, the system may be configured to evaluate how the display is handling the signal. For instance, the source, which generates the video signal, may be configured to determine whether the image generated by the display is consistent with its video signal or whether a user-experience can be enhanced. For instance, if the source generated a video signal without overscan and determines that the image is being cropped, then the source may be configured to take an action to reconfigure the video signal so that it will be displayed more consistent with the source's intended image to enhance the user experience. For instance, the source may reconfigure the video signal so that the intended image is contained within a sub-set of the image which is actually being displayed for the user. These are but some of the possible system configurations which are consistent with the concepts described above and below.

Exemplary Processes

Figure 6:
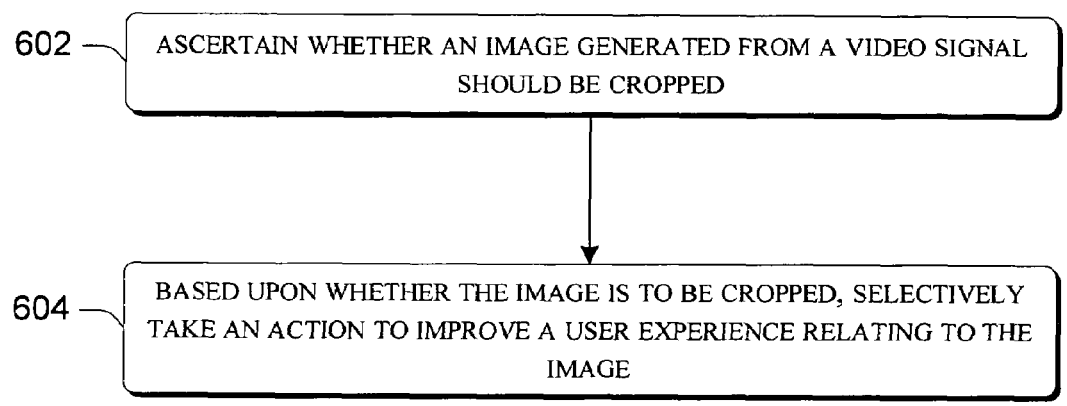
FIG. 6 is a flow diagram that illustrates a method for displaying an intended video image.

FIG. 6 represents a process for generating video images for a user and determining if the user experience can be enhanced.

Act 602 ascertains whether an image generated from a video signal should be cropped. The image enhancement process may evaluate or communicate with various system components such as the source of the video signal to ascertain whether the image should be cropped. Alternatively or additionally, in some instances the image enhancement process examines or assesses the video signal to determine if the video signal contains overscan.

Evaluate System Components

Various techniques can be utilized to evaluate or communicate with various system components to ascertain whether the image generated from the video signal should be cropped. In one example, the image enhancement process may expand upon existing communications which occur in some systems prior to the video signal being delivered over the system. In one implementation, the display may send an EDID to the source which indicates the display's configuration to crop or not to crop the image. In other instances, the display may send an EDID which confers other information such as how many pixels that the display crops from each side of the image.

Alternatively or additionally, the source may query display information from the display. In but one example, the source may utilize a DDC inquiry to learn about the properties of the display. For example, the source may determine if the display is configured to crop the image. Where appropriate, the source selectively can take appropriate actions to improve the user experience. Further examples should be recognized by the skilled artisan.

Evaluate the Video Signal

The image enhancement process may assess or examine the video signal to ascertain whether the resultant image should be cropped. The image enhancement process may evaluate the video signal at the source, the display or at some intervening point before being received by the display.

Several examples of image enhancement processes for ascertaining whether the video signal should be cropped, and which can be employed, at least at the display, are described below. One exemplary process applies a bit mask to some or all frames of the video signal. In the event that the video signal is an analog signal it first can be converted to a digital signal prior to applying the bit mask. Sequential frames to which the bit mask is applied can be compared to see if pixels are changing. Regions of images generated from a video signal received from a computer operating system often do not change between frames, often over rather long periods of time. For instance toolbars of a computer's desktop are generally static over time.

Pattern matching can provide a second example for assessing the video signal configuration. For instance, pattern matching a region of the image generated from the video signal can be utilized to determine if the region is generated by popular computer software applications or operating systems. For example, this characteristic could be analyzed on areas where a start bar or other feature of the computer's desktop is commonly located. This example may be combined with the example provided above such that the image enhancement process pattern matches a region of the image and also determines if the pattern matched area remains static. Such a technique may be a more reliable indicator that the video signal is coming from a computer environment than either technique alone.

A third example which builds upon the previously detailed second example is for the image enhancement process to detect some type of indicator in a non-visible portion of the video signal that indicates an overscan condition. The source can insert the indicator so that the process can determine the video signal's configuration. This allows a PC, or other non-overscan source, to encode a property or a codeword into the video signal such that the property or codeword need not be visible to a user. The property or codeword could be read or detected by the display.

Among other configurations, in an analog video signal the indicator may be encoded into the vertical blanking interval and in a digital video signal it may be encoded into a portion of the data stream which does not represent visible image data. For example, assume that the source is a PC which inserts a code into one or more regions in the video signal. In one particular example, the code might be a codeword such as "no-overscan" or "PC-mode" which is encoded as one or more frames of each of the letters of the word sequentially included in the signal.

The display detects the code and makes a determination regarding the source. In this example, the display may detect the code such as by bit masking.

Once the display serially detects the full codeword the process would know that a PC was sending this signal and therefore the image should not be cropped. Any number of watermark or video encoding techniques could be used to encode this information, many of which do not produce a noticeable artifact to the user.

Still another example for assessing video signal configuration can include detecting or receiving a second signal out of band from the primary video signal to indicate a condition of the source. This second signal may utilize an out of band mechanism such as an additional physical wire to signal that a PC, or other non-overscan source signal, is being delivered to the display, this could include a signal on an audio cable, over a home network or through a USB cable or infrared (IR) blaster cable.

Act 604, based upon whether the image is to be cropped, selectively takes an action to enhance a user experience relating to the image. As described above in relation to FIGS. 1-2, an action may be taken depending on the system configuration. For instance, if the process ascertains that the image generated from the video signal should be cropped and the display is configured to crop the image, no further action is taken to enhance the user experience. Similarly, if the image should not be cropped and the display is not configured to crop the image then no further action is taken to enhance the user experience. In contrast, if the image should be cropped and the display is not configured to crop the image, or if the image should not be cropped and the display is configured to crop the image then an action can be taken to enhance the user experience. Examples of various actions which can be taken to enhance the user experience are described below.

In one instance, the process may request a video signal which is configured to be consistent with the display device. For example, the display can send an EDID to the source to communicate its overscan condition or lack thereof. In one such example, the EDID may contain additional information, such as a number of pixels on top, bottom, left and right that the display is configured to crop.

Reconfigure the Video Signal

In some instances the process can take an action to enhance the user experience by reconfiguring the video signal. For example, assume for purposes of explanation, that in one exemplary system the display is a TV configured to default to an overscan condition. Further assume that, as described above in relation to act 602, the process ascertains that the image should not be cropped. In this context, several examples of actions which the process could take to enhance the user experience are described below.

In but one instance, the TV may reset the negotiated video interconnect with the source and renegotiate with the source a new configuration of the video signal based upon the knowledge that the present signal is not intended to be cropped. The TV can send a new set of information, such as in an EDID, to the source to indicate what resolutions it can best support to be scaled into the clean aperture.

For example, the TV may report its workspace or clean aperture. In a particular implementation, the TV reports a native resolution of the clean aperture to the source. In response to the new information the source can adjust its video signal so that the generated image more closely approximates the intended image. In one such example, the TV may report the pixels corresponding to the clean aperture of its display and request that the video signal be reconfigured such that the intended image is contained within those pixels. For example, the TV may report its clean aperture so that the source can generate the video signal to the proper resolution or the source can render the desktop in only a portion of the available pixels. So, for example, the source may at first send the video signal configured to a resolution of 1280 by 720 lines. The TV may then ask or direct the source to reconfigure the video signal to 1157 by 713 for example so that none of the intended image is cropped.

Some implementations may be further configured to allow user input regarding the image. For example, the TV may query the user to see if the user thinks that the intended image is being displayed. The TV may then act upon the user input. For example, the TV may provide a user interface to allow the user to make a determination as to whether the user experience can be enhanced. For instance, the display may display a message for the user such as "do you want to turn off the overscan feature?" The system then acts consistent with the user input. For instance, if the user desires to turn off the overscan, the display may send an EDID to the source describing the clean aperture so that the source may take an appropriate action. In other configurations, the TV may automatically detect a condition of the video signal and take responsive action, where appropriate, to enhance the user-perceptible image and then seek input from the user. For instance, the TV may, through a user interface, generate a box which states, for example, "An action has been taken to enhance the image. Press "enter" if the image is satisfactory, press "reset" to return to the previous image configuration." These are but two examples for allowing user input regarding the viewing experience and/or the effectiveness of any actions taken to enhance the user experience.

Adjust the Display

Rather than trying to get the video signal reconfigured, the display may take an action to enhance the user experience.

Assume for purposes of explanation, that in one exemplary system the display is a TV configured to default to an overscan condition. Further assume that, as described above in relation to act 602, the process ascertains that the image should not be cropped. In this context, several examples of actions which the TV could take to enhance the user experience are described below.

In but one example, the TV can take an action to cause the video signal's intended image to more closely approximate the image generated for the user. For instance, the TV can scale the incoming video signal such that the full workspace. i.e. intended image, essentially equals the image generated for the user. This can be achieved, among other ways, if the TV's video scaler chipset knows the clean aperture of the display. The video scaler then can scale the incoming video image such that it is rendered completely within the clean aperture. The video processor may, in some implementations, add filler pixels at the edge of the display for a fixed pixel display or to blank the beginning and end of each scan line on a CRT based display.

These are but a few of the potential system and process implementations for displaying an intended video image. Many other systems and processes are also consistent with the described concepts.

Although embodiments relating to methods and systems for displaying an intended video image have been described in language specific to structural features and/or methods, it is to be understood that the subject of the appended claims is not necessarily limited to the specific features or methods described. Rather, the specific features and methods are disclosed as exemplary implementations displaying an intended video image from a video signal.

The invention claimed is:

1. A method, comprising:
   ascertaining, in a predefined manner, independent of external control, whether an image generated from a video signal is to be cropped; and,
   based upon whether the image is to be cropped, automatically and selectively taking an action to enhance a user experience relating to the image in a manner transparent to the user, and without confirmation from the user, wherein said taking an action comprises renegotiating one or more parameters related to the video signal with a source of the video signal.

2. A method as recited in claim 1, wherein said video signal contains information relating to an intended image and wherein said taking an action comprises taking an action such that an actual image generated for a user from the video signal more closely approximates the intended image of the video signal.

3. A method as recited in claim 1, wherein said ascertaining comprises evaluating the video signal.

4. A method as recited in claim 1, wherein said ascertaining comprises communicating with a source of the video signal.

5. A method as recited in claim 1, wherein said taking an action comprises scaling the image.

6. One or more computer-readable media having computer-readable instructions which, when executed, implement the method of claim 1.

7. A consumer device configured to implement the method of claim 1.

8. A display, comprising:
   means for generating an image from a video signal; and,
   means for automatically, transparently, and without user confirmation, determining if the image should be cropped, and based on whether the image is to be cropped, automatically and selectively taking an action to enhance a user experience relating to the image, wherein said action comprises renegotiating one or more parameters related to the video signal with a source of the video signal.

9. A display as recited in claim 8, embodied as: a TV, a monitor, a personal digital assistant or a cell phone.

10. A display as recited in claim 8, wherein the means for determining comprises one or more computer readable instructions configured to be executed by a processor and which cause the processor to pattern match a region of the image to determine if the region is generated by PC software applications or operating systems.

11. A display as recited in claim 8, wherein the means for determining comprises one or more computer readable instructions configured to be executed by a processor and which cause the processor to cause a digital bit mask to be applied to the video signal to determine if the video signal has the characteristics of a computer video signal.

12. A display as recited in claim 8, wherein the means for determining comprises one or more computer readable instructions configured to be executed by a processor and which cause the processor to cause a communication to be sent to a source of the video signal to determine if the source intended the video signal to be cropped.

13. A display, comprising:
    a processor configured to process a video signal; and,
    computer readable instructions configured to be read by the processor and which cause the processor to ascertain, in a predefined manner, independent of external control, whether an image generated from the video signal should be cropped, and based upon whether the image is to be cropped, automatically and selectively in a manner transparent to the user, and without confirmation from the user, take an action such that an actual image generated for a user from the video signal more closely approximates an intended image of the video signal, wherein said taking an action comprises renegotiating one or more parameters related to the video signal with a source of the video signal.

14. A display as recited in claim 13, wherein said computer readable instructions cause the processor to ascertain whether the image generated from the video signal should be cropped by causing the processor to evaluate the video signal to determine if the video signal contains overscan and to determine if the display device is configured to crop the image.

15. A display as recited in claim 13, wherein said computer readable instructions cause the processor to ascertain whether the image generated from the video signal should be cropped by causing the processor to determine whether a source of the video signal is configured to generate video signals containing overscan and to determine if the display is configured to crop the image generated from the video signal.

16. A display as recited in claim 13, wherein said computer readable instructions cause the processor to selectively take the action such that the actual image generated for a user from the video signal more closely approximates the intended image of the video signal by causing the display to scale the image.

17. A display as recited in claim 13 embodied as a consumer device,
    wherein said taking an action comprises renegotiating one or more parameters related to the video signal with a source of the video signal.

* * * * *